J. A. GALLUP.
STEEL TRAP.
APPLICATION FILED APR. 15, 1910.
992,185.
Patented May 16, 1911.
Fig. I.
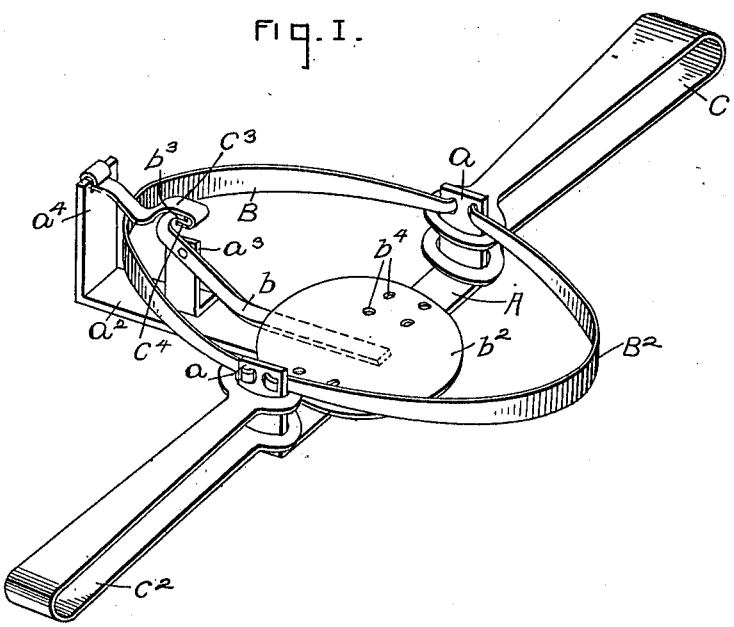
Fig. II.
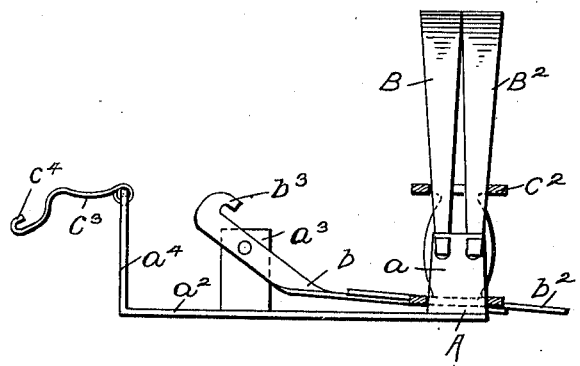
Witnesses:
H. E. Stonebraker
M. B. Faust
Inventor:
Jared A. Gallup
By R. S. Dyrenforth
his Attorney
THE NORRIS PETERS CO., WASHINGTON, D. C.

UNITED STATES PATENT OFFICE.

JARED A. GALLUP, OF MOOSUP, CONNECTICUT.

STEEL TRAP.

992,185.      Specification of Letters Patent.      Patented May 16, 1911.

Application filed April 15, 1910. Serial No. 555,683.

*To all whom it may concern:*

Be it known that I, JARED A. GALLUP, a citizen of the United States, residing at Moosup, in the county of Windham and State of Connecticut, have invented certain new and useful Improvements in Steel Traps; and I do hereby declare the following to be a full, clear, and exact description of the invention, such as will enable others skilled in the art to which it appertains to make and use the same.

My invention relates to an improvement in steel-traps, and is designed particularly for catching chicken-hawks and similar birds, while in the act of rising from the ground with their victims.

My trap, while similar in the general aspect, to the common form of steel-trap now in use, is distinguished, generally, therefrom in that the jaws are released upon lifting, or upward movement of the bait-pan, and it is the object of my invention to provide a simple, and efficient form of locking and releasing mechanism, for such a style of trap.

With these objects in view, my invention, in its preferred embodiment, includes the form of construction hereinafter described in detail, and pointed out in the appended claims.

In the accompanying drawings, forming a part of this specification, and in which like characters of reference refer to corresponding parts in the several views, Figure I is a perspective view of a trap, embodying my invention, and set for action, and Fig. II is a view, in side elevation, of the trap, with parts released.

Referring more particularly to the drawings, A is a base-plate, provided with the ears $a$, in which are pivoted the jaws B, $B^2$, respectively, which are held under tension by the springs C, $C^2$, all of said parts being constructed and arranged according to the usual form of steel-trap now in use. The base-plate A is provided with an extension $a^2$, on which are mounted the posts $a^3$, and $a^4$ respectively.

$b$ is a bar, pivoted, intermediate its extremities, to the post $a^3$, and carrying at its forward end the bait-pan $b^2$. The bar $b$ is provided at its rear end, with an upward and forward extending hook $b^3$.

Pivotally mounted on the post $a^4$, is an arm $c^3$, curved downward from its pivotal point, and upward at its forward end, to form a locking-catch $c^4$, as shown in the drawings. It is to be noted that the arm $c^3$ is so shaped, that upon release of the jaws, and upward movement of the same, the jaw B will be guided past the catch $c^4$, so as not to be held thereby.

The bait-pan is provided with a series of openings $b^4$ by which a chicken, or other bait, may be secured.

In operation, the bait is first attached to the pan, and the jaws then forced down, causing jaw B to assume a position between the posts $a^3$ and $a^4$. The arm $c^3$ is then thrown forward catch $c^4$ engaging with the hook $b^3$ and thereby holding the parts in operative position. Upon any effort to remove the bait from the pan, the pan is raised, and the rear end of arm $c^3$ is lowered, causing hook $b^3$ to disengage from the catch $c^4$, and permit the jaws to rise, and hold the animal. The jaws are of such size, as to permit them to rise around the bait, without engaging the same.

It is to be understood that various slight changes and modifications may be adopted, without departing from the spirit of my invention, and I desire to protect by this application, any such construction as comes within the scope and purview of my invention, and the claims hereto appended.

What I desire to secure by Letters-Patent, and claim, is:

1. A steel-trap, including a base-plate, spring-controlled jaws pivoted to said base-plate, a post mounted on the base-plate, a bar pivoted to said post and carrying a bait-pan at its forward end, said bar being provided at its rear end with an upward and forward extending hook, and an arm pivoted behind said bar and having a downward curved portion and a locking-catch in advance thereof, to coöperate with the aforementioned hook.

2. A steel-trap, including a base-plate, ears carried by the base-plate, spring-controlled jaws pivotally mounted on said ears, the distance between the opposite ears being less than the height of the jaws, a post mounted on the base-plate, a bar pivoted to said post, and carrying a bait-pan at its forward end, said bar being provided at its rear end with an upward and forward extending hook, and an arm pivoted in the rear of said bar and having a downward curved portion and a downward and rearward extending hook at the front of said downward curved portion, to coöperate with the first-mentioned hook.

In testimony whereof, I affix my signature, in the presence of two subscribing witnesses.

JARED A. GALLUP.

Witnesses:
ARTHUR G. BILL,
JENNIE E. REDDY.

Copies of this patent may be obtained for five cents each, by addressing the "Commissioner of Patents, Washington, D. C."